United States Patent [19]
Lotz

[11] Patent Number: 6,105,872
[45] Date of Patent: Aug. 22, 2000

[54] ADAPTER FOR SCC READER

[75] Inventor: Reinhard Lotz, Erzhausen, Germany

[73] Assignee: Thomas & Betts International, Inc., Sparks, Nev.

[21] Appl. No.: 09/197,835

[22] Filed: Nov. 23, 1998

[51] Int. Cl.[7] .................................................. G06K 7/00
[52] U.S. Cl. ........................ 235/486; 439/475; 439/630
[58] Field of Search .................................... 235/380, 381, 235/382, 486, 475, 482; 439/248, 475, 630; 361/741, 742, 756, 757, 758

[56] References Cited

U.S. PATENT DOCUMENTS

| | | | |
|---|---|---|---|
| 4,711,993 | 12/1987 | Kosednar et al. ........................ | 235/380 |
| 4,813,879 | 3/1989 | Thenaisie et al. . | |
| 4,873,425 | 10/1989 | Langlais et al. ........................ | 235/441 |
| 4,900,273 | 2/1990 | Pernet . | |
| 4,931,622 | 6/1990 | Ohtsuki et al. . | |
| 5,040,915 | 8/1991 | Stuart et al. ............................ | 403/322 |
| 5,151,847 | 9/1992 | Rautenberg . | |
| 5,508,501 | 4/1996 | Fujimoto et al. ........................ | 235/441 |
| 5,563,397 | 10/1996 | Fujimoto et al. ........................ | 235/441 |
| 5,613,866 | 3/1997 | Niimura . | |
| 5,667,408 | 9/1997 | Broschard, III et al. . | |
| 5,743,766 | 4/1998 | Kaneshige et al. . | |
| 5,850,079 | 12/1998 | Ohwa et al. ............................. | 235/475 |
| 5,883,372 | 3/1999 | Kim ......................................... | 235/441 |

*Primary Examiner*—Donald Hajec
*Assistant Examiner*—J Yven
*Attorney, Agent, or Firm*—Hoffman & Baron, LLP

[57] ABSTRACT

An apparatus for reading chip cards includes a housing, a printed circuit board arranged in the housing and a card reader which is arranged above the printed circuit board. The housing has a slot for introduction of the chip card. The slot in the housing wall and a guide means are arranged behind the slot in the wall, for the chip card, so that the slot in the card reader is aligned with the guide means. A spacer is arranged between the printed circuit board and the card reader, and the spacer is fixedly connected to the printed circuit board, and the card reader is releasably connected to the spacer.

8 Claims, 3 Drawing Sheets

ADAPTER FOR SCC READER

FIELD OF THE INVENTION

The present invention relates generally to an apparatus for reading chip cards. More particularly, the present invention relates to a chip card reader apparatus having a guide in alignment with the slot for receipt of the chip card.

SUMMARY OF THE INVENTION

Apparatuses and automatic machines which dispense goods and travel tickets when coins are inserted have been known for decades. The manufacturers of such apparatuses and automatic machines are constantly at war with thieves who employ various dodges and ploys in their attempts to get to the coin storage means, or to break open the apparatuses and machines using more or less force. That general kind of apparatuses and machines also includes coin-operated telephones which were previously installed by the postal authorities and nowadays by the telecommunication authorities. Increasingly those apparatuses and automatic machines are no longer actuated with coins but with chip cards. Those chip cards include credit cards, the so-called Eurocards, telephone cards which are issued by the telecommunication authorities, and cash cards which are issued by credit institutions. Such apparatuses and machines do not have coin storage means and for that reason they are no longer broken into.

Unfortunately, vandalism is on the increase, because of the decline in morals. The result of this is that, instead of introducing a chip card into the slot, people insert a flat article, for example, a screwdriver or the blade of a knife, and move it to and fro with the intention of destroying parts of the apparatus which are disposed behind the slot. Disposed behind the slot are the card reader and the printed circuit board which is electrically and mechanically fixedly connected thereto. Inserting the flat article and moving it to and from always damages and even completely destroys the card reader and frequently also the printed circuit board. The apparatus is no longer ready for operation, irrespective of the degree of damage inflicted. It has to be checked out by an expert or at least a semi-skilled operator and the damaged or destroyed parts have to be replaced by fresh parts. Frequently the old printed circuit board has to be replaced by a new one. Such a printed circuit board is comparatively expensive.

On the basis thereof, the inventor set himself the object of so designing a card reading apparatus that, in the event of malicious intervention, only a minimum proportion of parts is damaged or destroyed, and care is taken to ensure that the expensive printed circuit board is preserved.

In an apparatus of the general kind set forth in the opening part of this specification, to attain that object, the inventor proposes that a spacer is arranged between the printed circuit board and the card reader and the spacer if fixedly connected to the printed circuit board and the card reader is releasably connected to the spacer. With that stricture the spacer separates the delicate and expensive printed circuit board from the card reader. If a person inserts a flat hard article into the card reader and moves it to and fro with that article, the printed circuit board is not affected. By virtue of the spacing which is predetermined by the spacer between the card reader and the printed circuit board, the latter is not affected by the inserted article, even if it is moved to and fro vigorously. In addition the connection between the card reader and the spacer is released. Movements of the inserted article are therefore no longer transmitted to the spacer and thus also not to the printed circuit board. Under some circumstances the card reader is speared onto the inserted article. When it is pulled out, it drops down on to the bottom of the housing. The aim of the invention, namely preserving the printed circuit board in an undamaged condition, is thus achieved.

From a mechanical and electrical point of view the card reader is a simpler component than the printed circuit board. For that reason a damaged or destroyed card reader can be replaced by a new card reader by the same person who fills the apparatus with fresh items to be dispensed therefrom.

Desirably the spacer is a frame or a frame-like component of plastic material. Its dimensions correspond to those of the card reader. Mutually aligned holes are provided in the card reader and in the frame. They are releasably connected together by way of connecting elements which are inserted into them. These may be smooth cylindrical pins which are held with a push fit in the holes. That push fit is adequate under normal operating conditions to connect the card reader to the frame. When a flat article is introduced and force is applied, the pins come loose from their push fit in the holes. Therefore, as is intended, the card reader comes away from the frame and the printed circuit board.

The connecting elements can also be in the form of spreader or expandable pins, similar to dowels, or in the form of pins with a desired-fracture location.

For electrically connecting the card reader to the printed circuit board, the invention provides that pins are arranged at the underside of the card reader and contacts which are aligned with the pins are arranged in the frame. Solder connections extend from the lower ends of the contacts. They are soldered to SMD-pads on the printed circuit board. That means that the contacts on the frame are soldered to the SMD-pads on the printed circuit board. There are plug connections between the card reader and the frame. They come open when the card reader is pressed away by force.

The frame lies on the printed circuit board. Components are arranged on the printed circuit board, in the free space which is enclosed by the frame.

The invention will now be further described by way of the example of the embodiment illustrated in the drawing in which:

BRIEF DESCRIPTION OF THE DRAWING FIGURES

FIG. 1 perspective view of an item dispensing apparatus

FIG. 2 is a view on a larger scale in section taken along line II—II showing the card reader, the space and the printed circuit board when a chip card is inserted FIG. 3 is a similar view to FIG. 2 upon the insertion of a hard article with the card reader breaking away, and FIG. 4 is an exploded perspective view of the printed circuit board, the spacer and the card reader.

DETAILED DESCRIPTION OF THE PREFERRED EMBODIMENT(S)

Figure 1:
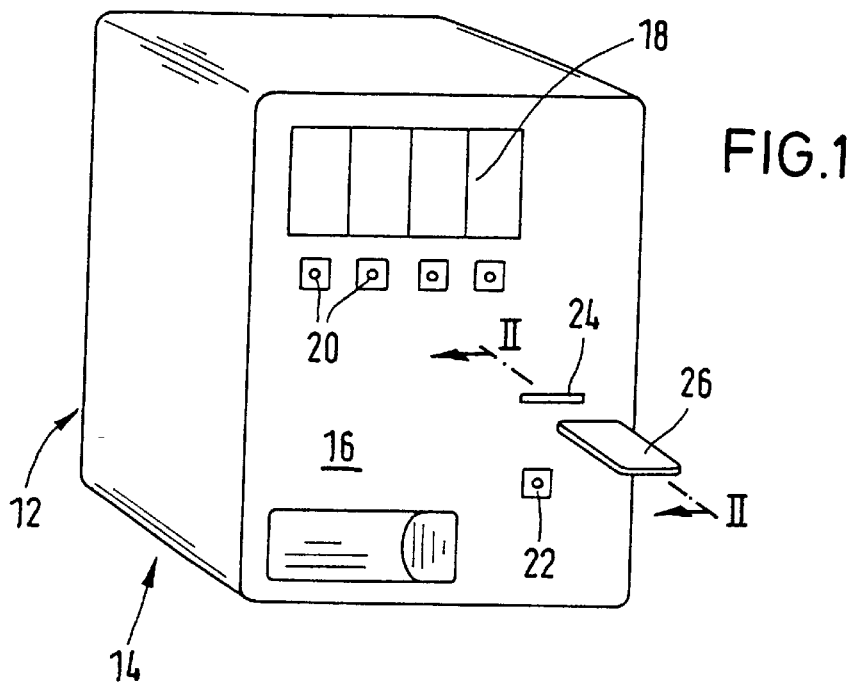

FIG. 1 shows an automatic machine 2 for dispensing goods for items, comprising a housing 14, a front panel 16, a display 18 for representing the items on offer, buttons 20 for selecting an item, a return button 22 and a slot 24 for the insertion of a chip card 26. The item to be dispensed is removed from an item dispensing opening 28.

Figure 2:
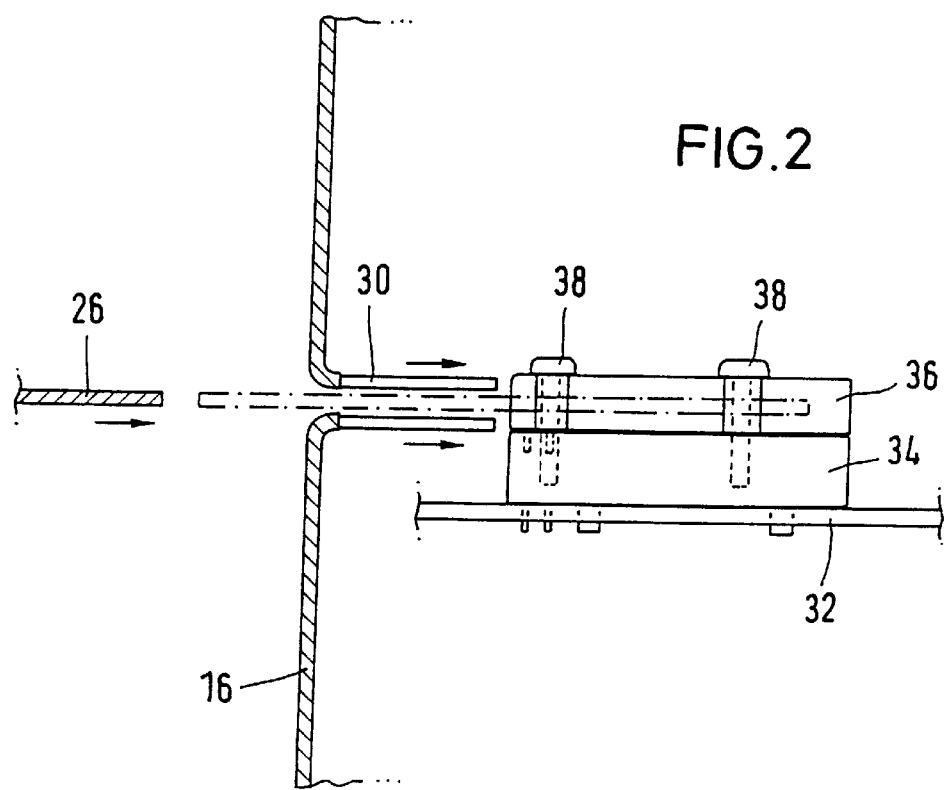
Figure 3:
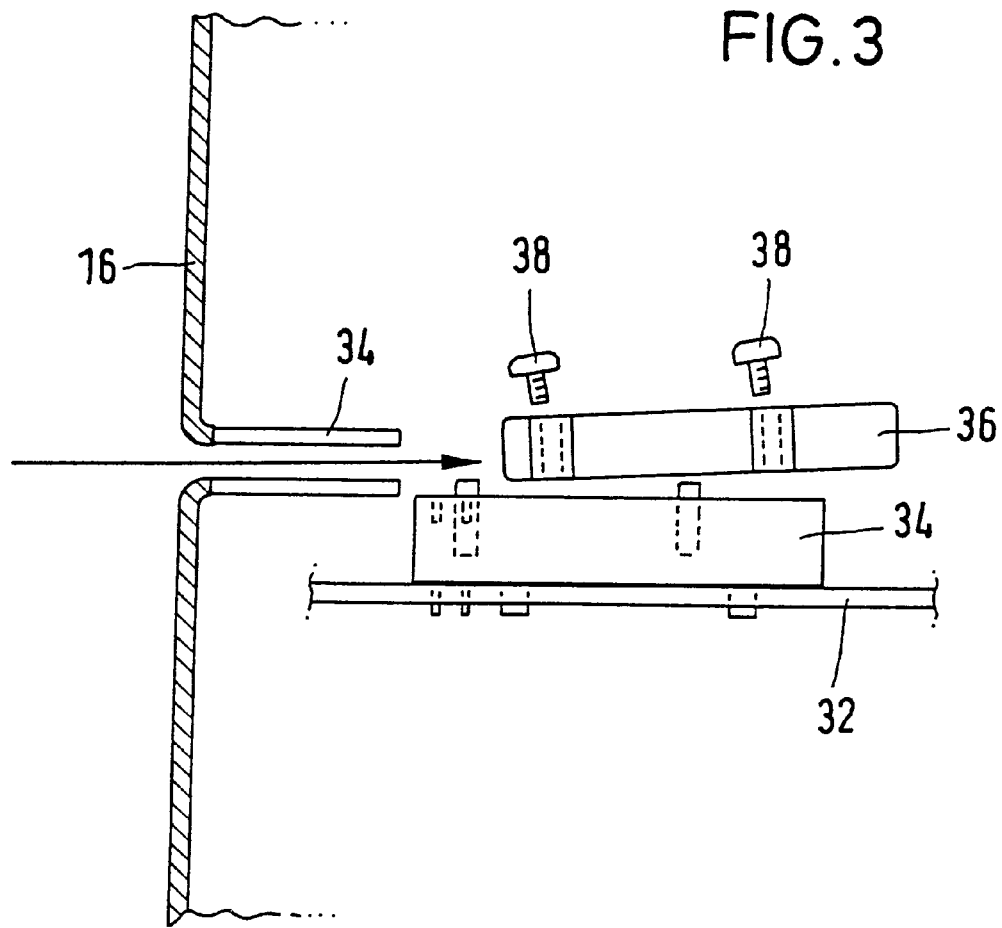
Figure 4:
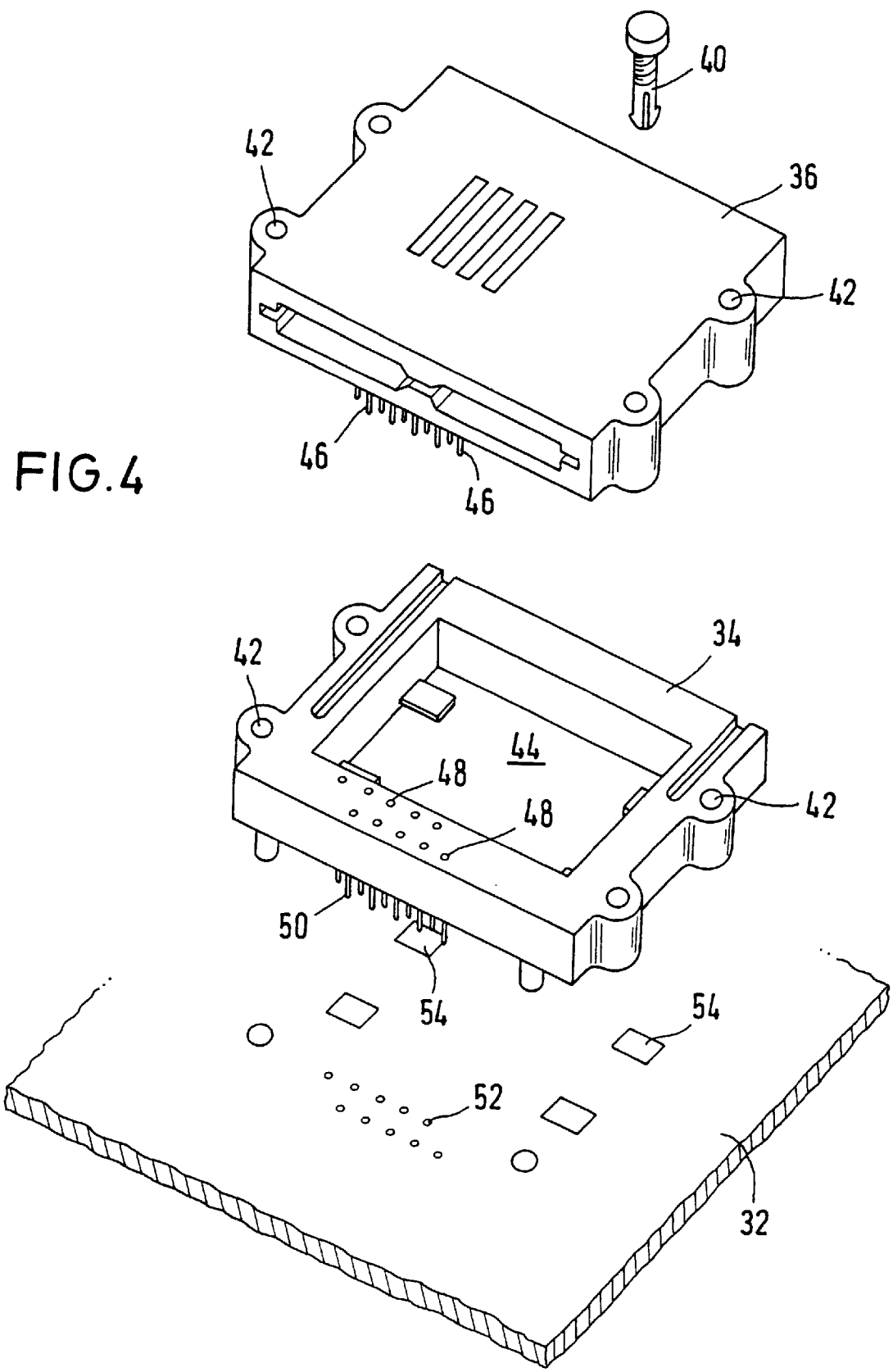

FIGS. 2 and 3 show the guide means 30 provided in the front panel 16, for guiding the chip card 26. Disposed behind the guide means 30 and, when looking at the Figures, to the right of the guide means, are the printed circuit board 32, the frame 34 forming the spacer, and the card reader 36. The frame 34 is fixedly connected to the printed circuit board 32 in a manner which is not part of the present invention. Connecting elements 38 which are in the form of pins hold the card reader 36 on the frame. The crucial consideration is that the connecting elements can be easily released from their mounting. A suitable pin is shown in FIG. 4, in the form of a spreader or expandable pin 40. At the two ends thereof, the frame 34 and the card reader 36 have holes 42. The connecting elements 38 or the spreader pins 40 are introduced into the holes 42. As shown in FIG. 4 the frame 34 encloses a free space 44. FIG. 4 further shows the pins 46 which extend from the underside of the card reader 36. They pass into contacts 48 provided in the frame 34. SMD-solder connections 50 extend from the underside of the contacts 48. The solder connections 50 are soldered to the SMD-pads 52 on the printed circuit board 32. Desirable components 54 are in the free space 44 which is enclosed by the frame 34.

FIG. 2 shows the normal situation of operation. A chip card 26 is inserted by way of the guide means 30 into the card reader 36. It is contacted therein. In a known manner which is not part of the present invention, the chip card 26 is read and identified, amounts of money are paid out, and so forth. The electrical procedures involved take place in the printed circuit board.

FIG. 3 shows the malicious insertion of a hard article. This is indicated by the arrow. The inserted article encounters the card reader 36. The person inserting the article exerts such high forces that the connecting elements are disengaged from the holes of the frame 34 and/or the card reader 36 so that it comes free. When that happens any connection between the hard article inserted and the printed circuit board 32 remains undamaged. The card reader 36 can be removed from its normal position by such a distance that it drops down on to the bottom of the housing 14. The automatic item-dispensing machine 12 becomes inoperable.

As was stated above and is apparent from the foregoing description, the technically and electrically untrained person who fills the automatic item-dispensing machine 12 with fresh items to be dispensed can fit a new card reader 36 on to the frame 34 and secure it to the frame 34 with the connecting element 38. That person can equally easily retrieve the damaged or destroyed card reader 36 from the housing 14. That person does not incur any additional costs, unless he is required to replace a card reader 36 just after the machine has been filled. The costs of the card reader 36 and the connecting elements 38 are however far lower than the costs of the printed circuit board 32. Added to that is the fact that printed circuit board 32 is fixedly installed in the housing 14 and is also electrically connected. Replacing a printed circuit board 32 therefore also involves high wage costs. These are not incurred when the invention is used.

Various changes to the foregoing described and shown structures would now be evident to those skilled in the art. Accordingly, the particularly disclosed scope of the invention is set forth in the following claims.

What is claimed is:

1. An apparatus for reading chip cards comprising a housing, a printed circuit board arranged in the housing, a card reader which is arranged above the printed circuit board and which is electrically selectively connected thereto and which has a slot for introduction of the chip card, and a slot in a housing wall and guide means arranged behind the slot in the wall, for the chip card, wherein the slot in the card reader is aligned with the guide means; and a spacer arranged between the printed circuit board and the card reader, and the spacer is fixedly connected to the printed circuit board and the card reader is releasably connected to the spacer.

2. An apparatus as set forth in claim 1, wherein the spacer is a frame.

3. An apparatus as set forth in claim 2, wherein the card reader includes aligned holes in the frame releasably connected by way of connecting elements which are introduced thereinto.

4. An apparatus as set forth in claim 3, wherein the connecting elements are pins which held with a push fit in the holes.

5. An apparatus as set forth in claim 3, wherein the connecting elements are spreader pins.

6. An apparatus as set forth in claim 3, wherein the connecting elements are pins having a desired rupture location.

7. An apparatus as set forth in claim 1, further including pins arranged at the underside of the card reader and contacts provided in the frame and aligned with the pins, with solder connections extending from the lower ends thereof, and with SMD-pads arranged on the printed circuit board and connectable to the solder connections.

8. An apparatus as set forth in claim 1, further including elements mounted on the printed circuit board in the region of the free space enclosed by the frame.

\* \* \* \* \*

UNITED STATES PATENT AND TRADEMARK OFFICE
CERTIFICATE OF CORRECTION

PATENT NO. : 6,105,872
DATED : August 22, 2000
INVENTOR(S) : Reinhard Lotz

It is certified that error appears in the above-indentified patent and that said Letters Patent is hereby corrected as shown below:

The printed patent incorrectly omitted the Claim of Priority. The patent should read -- Foreign Application Priority Data - German Patent No. 297 21 637.6, November 25, 1997 --

Signed and Sealed this

Eighth Day of May, 2001

Attest:

NICHOLAS P. GODICI

Attesting Officer     Acting Director of the United States Patent and Trademark Office